United States Patent
Caesar et al.

(10) Patent No.: US 6,917,720 B1
(45) Date of Patent: Jul. 12, 2005

(54) REFERENCE MARK, METHOD FOR RECOGNIZING REFERENCE MARKS AND METHOD FOR OBJECT MEASURING

(75) Inventors: Torsten Caesar, Ulm (DE); Martin Michaelis, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/445,914

(22) PCT Filed: Jul. 4, 1997

(86) PCT No.: PCT/EP98/03910
§ 371 (c)(1),
(2), (4) Date: Mar. 27, 2000

(87) PCT Pub. No.: WO99/01841
PCT Pub. Date: Jan. 14, 1999

(30) Foreign Application Priority Data

Jul. 4, 1997 (DE) .......................................... 197 28 513

(51) Int. Cl.[7] .................................................. G06K 9/56
(52) U.S. Cl. ........................ 382/287; 382/165; 382/205
(58) Field of Search ................................ 382/181, 183, 382/287, 289, 291, 165, 205; 235/462.09, 462.11, 462.41, 494

(56) References Cited

U.S. PATENT DOCUMENTS

| | | | | |
|---|---|---|---|---|
| 4,776,464 A | * | 10/1988 | Miller et al. .................. | 209/3.3 |
| 4,924,078 A | * | 5/1990 | Sant'Anselmo et al. .... | 235/494 |
| 5,103,489 A | * | 4/1992 | Miette ........................ | 382/101 |
| 5,189,292 A | * | 2/1993 | Batterman et al. .......... | 235/494 |
| 5,515,447 A | * | 5/1996 | Zheng et al. ................ | 382/100 |
| 5,691,527 A | * | 11/1997 | Hara et al. .................. | 235/456 |
| 5,726,435 A | * | 3/1998 | Hara et al. .................. | 235/494 |
| 5,764,798 A | * | 6/1998 | Liu ............................ | 382/190 |
| 6,053,407 A | * | 4/2000 | Wang et al. ................ | 235/454 |
| 6,094,509 A | * | 7/2000 | Zheng et al. ............... | 382/218 |

OTHER PUBLICATIONS

Webster's Ninth New Collegiate Dictionary, Merriam–Webster, Inc., 1991, p. 1189.*
Ahn, S.J. (1997) "Kreisformige Zielmarke"; 4. ABW–Workshop, TA Esslingen, Jan. 22–23, 1997.
Goding, R. (1997) "Neue Aufnahme– und Auswertetechniken in der RolleiMetric Close Range Workstation (CDW)", Firmenprospekt der Firma Rollei Fototechnik, 1997.

* cited by examiner

*Primary Examiner*—Jon Chang
(74) *Attorney, Agent, or Firm*—Pendorf & Cutliff

(57) ABSTRACT

The invention relates to a reference mark, a method for recognizing reference marks and a method for object measuring. According to the invention, the object is fitted with coded reference marks. Said marks are automatically recognized and decoded by the inventive method for reference mark recognition, whereupon a three-dimensional representation of the object is realized. According to the invention, the method compensates automatically for geometrical and radiometric interferences and generates at least one quality measurement to evaluate the quality of recognition and decoding. The invention particularly enables fast recognition and decoding of large numbers of reference marks and fast measuring of objects.

13 Claims, 3 Drawing Sheets

REFERENCE MARK, METHOD FOR RECOGNIZING REFERENCE MARKS AND METHOD FOR OBJECT MEASURING

BACKGROUND OF THE INVENTION

1. Field of the Invention

The invention generally concerns a process for recognition of reference marks according to the pre-characterizing portion of patent claim 1, as well as a process for measuring or surveying objects.

2. Description of the Related Art

Reference marks and processes of this type are already generally known from Ahn, S. J. (1997)-"Kreisförmige Zielmarke" (Circular-Shaped Measuring Marks); 4.ABW-Workshop, T A Esslingen, 22–23 Jan. 1997.

Reference marks and processes of this type serve for example for reducing the time sequence for measuring or surveying tasks in the industry. Lately it has primarily been optical measuring processes such as photogrammetry and strip or line projection that have received increasing importance. Basic requirements for this type of process include a robust design of the measuring process and a substantial automation. There is often a requirement for a rapid, comprehensive 3D measurement of larger objects, which must subsequently be available as a CAD data record. Optical measuring systems based on the principle of line-projection provide comprehensive 3D data covering the surface of the object being measured. The measurement volume of this system, which as a rule is limited, requires important supplemental information, such as connection points of an overall coordinate system, which makes possible a fitting assembly of multiple sets of measurements. The information necessary therefore, such as the 3D coordinates of pass-points, are provided by photogrammetry. With reference to the ability to automate the photogrammetric measuring and evaluation process, the measurement or gauging of the image receives a particular significance. With the increasing number of the image points to be measured or, as the case may be, the number of pictures of a total set, the investiture for identification of homologous image points increases dramatically. In order to keep the time requirement therefore as small as possible, reference marks are increasingly employed in practice which exhibit, besides a usually circular-shaped survey or index mark to be detected, also information-containing encoded marks. These encoded marks which can take various forms are designed to serve either for the improved visual oversight in the course of an image measurement carried out interactively by the user ("clicking" on homologous image points) or for an automated recognition of reference marks. In practice a number of problems occur in the recognition of reference marks due to the influence of geometric disturbances, such as for example rotation and/or distortion of the reference mark. In order to make it possible for a computer to compensate for these types of disturbances, it is advantageous when orientation features are supplementally provided on the reference marks.

The flexibility and robustness of an automated reference mark recognition system is determined in particular by the characteristics of the encoding employed. The value range (code depth) of the ring coding system employed widely in practice is limited, since only a limited number of encoding segments can be resolved. An increase of the data or value range is relatively inconvenient and would necessarily require a substantial. enlargement of the reference mark. Another factor influencing the automatic reference mark recognition system is the quality of the encoded image. Important influence factors thereon are geometric distortions, for example brought about by rotation, changes in scale, shearing, compression or perspective distortion of the referenced mark, or radiometric disturbances such as image static, reflections, lack of contrast, local contrast differences, and image sharpness or even partial covering over of the referenced mark. A compensation for this type of disturbance factor would substantially improve the automated reference mark recognition.

Erroneous recognition of a reference mark has a substantially larger error-influence on the subsequent evaluation process, for example on the surveying of an object, than would a rejected reference mark which is thus not taken into consideration (Goding, R. (1997) "Neue Aufnahme-und Auswertetechniken in der RolleiMetric Close Range Workstation (CDW)" (New Recording and Evaluation Techniques in the RolleiMetric Close Range Workstation) firm brochure of the company Rollei Photo Technique). This type of erroneous reading can be greatly reduced by determining a recognition quality, which makes it possible for the user to set thresholds for the rejection of the reference mark.

SUMMARY OF THE INVENTION

The present invention is concerned in a first aspect with providing a process, with which reference marks can be recognized as rapidly and assuredly as possible and which is as robust and flexible as possible. A second aspect of the invention is the providing of a process for the measurement of objects, which most effectively utilizes the process for recognition of reference marks to be provided. A third aspect of the invention is the provision of a reference mark that can be recognized particularly rapidly and accurately in the process to be provided for recognition of reference marks.

The essence of the invention with respect to the process for recognition of reference marks is comprised therein, that a digital representation of a potential reference mark produced using electromagnetic waves of the optical or adjacent wavelength range, comprised of pixels with known pixel-coordinates of the center, potentially containing surveying (indexing), orientation and encoding characteristics, automatically compensate for geometric and radiometric distortion influences and distortions due to partial covering of the reference mark, and establish at least one determination of quality for the recognition of the reference mark, and at least one test for deciding recognition of an actual reference mark or rejection of a poor reference mark, the test being carried out based on meeting a minimum quality determination, and that from the encoded characteristics of an actual reference mark a characteristic reference vector is formed, which is supplied or assigned to a classification.

In a first advantageous embodiment of the inventive process for recognition of reference marks, referred to in the following as the reference mark recognition process (RMR process), the digital image of the supposed or actual reference mark is first locally converted to a binary signal, and only thereafter is a compensation performed for disturbances, a check performed for at least one rejection criteria, and a determination made of a characteristic vector of an actual reference mark. The conversion to binary signal is carried out for the compensation of radiometric disturbances, in particular for contrast enhancement. The advantage of the local conversion to binary signal, that is, in the vicinity or environment of the potential reference mark, as compared to a global conversion to binary signal, that is over the entire image with multiple reference marks, resides in the usually substantially improved compensation of radiometric disturbances, in particular an increased contrast enhancement.

In a second advantageous embodiment of the inventive RMR process, contiguous areas within the digital image of the supposed or actual reference mark are identified, and it is decided on the basis of these contiguous areas whether the object being examined is a supposed or an actual reference mark, and that a rejection occurs based on detection of a disturbance in the arrangement of these association areas, that is, for example, a supposed reference mark is in the shape of a reflection, and in the arrangement of the contiguous area of an actual reference mark there is a clear arrangement for the individual contiguous areas in such a manner, that it is recognized which individual contiguous areas contain surveying characteristics and/or orientation characteristics and/or encoded characteristics. The advantage of this design lies on the one hand therein, that by limiting the image content to be examined to the contiguous areas one is examining only the carriers of essential information, and thereby accelerating the process, and on the other hand therein, that by the placement of specific types of characters in the various contiguous areas it becomes possible, for the extraction of specific desired information, for example the orientation of the reference mark, to examine only certain contiguous areas, namely those which contain the orientation characteristics, and thus likewise accelerate the process.

The identification of the contiguous areas can occur advantageously in various manners. First, a contiguity analysis of color objects of the digital image of the supposed or actual reference mark can occur, in which all pixels of the digital image, of which the color values lie within a predetermined value range, are allocated or assigned to a color value object. Second, a contiguity analysis of gray-value objects of the digital image of the supposed or actual reference mark can incur such that all pixels of the digital image, of which pixels the gray value lies within a predetermined value range, are allocated to a gray value object. Third, a coordinate analysis of white objects of the binary converted digital image of the supposed or actual reference marks can occur. Each of these possible designs of the inventive RMR process is associated with special advantages. The examination of color values makes possible a more precise identification of contiguous areas than with gray values, in particular when in the contiguous areas clearly distinguish themselves from the environment in their colors and their light intensity. The examination of gray values requires less computer time and a simpler, and therewith more economical, signal detection for establishing the digital image of the referenced mark. The examination of white objects of a digitized image requires the least amount of computer time and is thus the most rapid.

In a further advantageous design of the inventive RMR process the survey characters, orientation characters, and encoded characters of the reference marks are provided in a known, fixed number, and possess known, fixed geometric relationships relative to each other, in particular known fixed spacing and relative positions to each other and exist in a known, fixed size relationship to each other. The determination, on the basis of the contiguous areas, as to whether the examined object is a supposed or an actual reference mark, is then accomplished, when it is checked as to whether the individually detected contiguous areas are present in the predetermined minimum number, and lie within a predetermined, preferably freely predetermined, tolerance range in their known geometric relationships to each other. A design of the reference marks of this type makes possible the above-mentioned process and thus a simplified, and therewith rapid but nevertheless reliable decision making, as to whether the object being examined is a supposed or an actual reference mark.

In a further advantageous design of the inventive RMR process, a simplified representation of the detected orientation regions is produced and by this simplification the further evaluation is accelerated. Of particular advantage is a substantial simplification of the contiguous area with simultaneously minimal information loss and the smallest amount of involvement in calculation or evaluation. This objective is substantially achieved by the contour representation of the contiguity areas by polygons, a so-called polygon representation, and is better achieved by substituting for the original polygon representation an approximated polygon representation, a so-called polygon approximation. A process which has been found to be particularly effective for a polygon approximation is a process in which support points of the original polygon of the contour representation are exclusively extracted and this is carried out so long until a predetermined, maximal acceptable area or surface or zone deviation is exceeded. Thereby in particular contour falsifications attributable to detection and/or binary conversion influences can be compensated for.

In a further advantageous embodiment of the inventive RMR process, is first identified, out of the totality of the detected contiguity areas of an actual reference mark, using the geometric relationships of the various reference areas to each other, at least one contiguity area which contains the orientation character, and from this orientation character determines the actual orientation of the reference mark, after which a normalization to a standard predetermined, normalized orientation is carried out, in particular a normalization of the digitized image of the reference mark or the contiguity areas or representations of the contiguity areas. The advantage of this design is comprised therein, that by the focusing or limitation of the examination to the orientation areas which correspond to the predetermined geometric relationships and which in accordance therewith contain orientation reference marks, the determination of the actual orientation of the reference mark can be achieved, on the one hand, with less calculation and thus more rapidly and, on the other hand, with a less error, so that the influence of disturbances in the calculation is substantially precluded. Accordingly, also the standardization of all reference marks to be processed to a predetermined unified orientation is qualitatively of higher value. The standardization itself is necessary to compensate for geometric disturbances in the recognition of the reference marks.

In a further step of this advantageous embodiment of this inventive RMR process, there is identified, out of the totality of the detected contiguity areas, by use of the recognition of the geometric relation of the various contiguity areas to each other, a contiguity area which is the bearer of encoded characteristics, and then this contiguity area, which was identified as the bearer of encoded characteristics, is standardized to fit on an n-by-n grid, for example on a 16×16 grid. The advantage of this design of the process is comprised also therein, that by the limitation or reduction of the examination to the contiguity areas which correspond to the predetermined geometric relations and which in accordance therewith contain encoded characteristics, the determination of the actual encoding of the reference mark is accomplished on the one hand with less computation and therewith more rapidly, and on the other hand with less error, since the need to take disturbances or distortions into consideration is substantially precluded in the calculation. This standardization of the contiguity areas to a quadratic grid compensates for disturbances due to varying sizes of the contiguity areas of various reference marks, which for example are caused by varying distances of detection, and provides in each grid element an easily and therewith rapidly identified data carrier.

In a further particularly advantageous intermediate step of this advantageous design of the RMR process, the individual grid elements of the intercontiguous areas, which are identified as bearers of encoded characteristics and are standardized, are scaled over a maximal color value range or gray value range, for example over a gray value range of 0 to 225. The advantage of this design is comprised in the compensation of radiometric disturbances, in particular in contrast enhancement. The characteristics of the individual character bearers, namely the grid elements, are made more strongly distinguishable and therewith a subsequent classification is simplified or facilitated.

In a further step of this advantageous embodiment of the inventive RMR process, each color or gray value of the grid element of a contiguous area, which was identified as the bearer of encoded characteristics, is detected as a component of a small n-by-n dimensional, for example 256 dimensional, character vector of this intercontiguous area, and then this character vector is subjected to a major axis transformation of the type such that the individual components of the transformed character vector are provided arranged in a sequence corresponding to their value or importance for the classification. Thereafter a limited number of the components of the transformed character vector, counted beginning with the first and therewith most important component, for example the first 40 components, are subjected to an individual-object classification, here for example a one-step quadratic polynomial classification. The advantage of this design is comprised therein, that the classification can be limited to the essential information bearers, that is, the first components of the character vector, and therewith be accelerated.

In a further step of this advantageous embodiment of the inventive RMR process, a statistical correlation or probability factor is calculated using this classification, of which the component number corresponds to the number of the possible encoded objects, and of which the components provide the probability of the identification of a certain object class. Thereafter, an object class is identified in such a manner that the object class of which the identification occurred with the highest probability is presumed to be the correct one, so long as this probability exceeded a predetermined minimal value. In the other case, that is, when no object class was identified with a probability beyond the predetermined minimal probability, then a rejection of the reference mark occurs. The advantage of this design of the process is comprised on the one hand therein, that by the taking into consideration of all individual important components of the characteristic vector as information carriers for the possibility calculation of a correct identification of an object class, a partial masking of the reference mark can be compensated for. On the other hand, as a result of this design, objects or as the case may be reference marks, which nevertheless were not identified clearly or, as the case may be, not with sufficiently high probability, are rejected, and this is substantially better for the subsequent data processing than an erroneous classification.

In a further advantageous design of the inventive RMR process, the reference marks to be recognized are comprised of independent, spatially separated survey characters, orientation characters, and encoded characters. The advantage of this design is comprised therein, that by this clear separation, in particular of orientation characters and encoded characters, on the one hand the recognition becomes substantially more robust, and on the other hand a substantially greater freedom of encoding is made available and thus the depth of encoding can be increased.

In a further advantageous embodiment of the inventive RMR process, the reference marks to be recognized are comprised of survey characters, orientation characters in at least two special or preferred directions, particularly advantageously in two preferred directions perpendicular to each other, and encoded characters in the form of a fixed number of known figures and/or symbols, wherein the survey characters, orientation characters, and encoded characters are provided in a known fixed arrangement and wherein the survey characters, orientation characters, and encoded characters have a geometric relationship which is known and fixed relative to each other, in particular having known, fixed separation and positions relative to each other, and which have a known and fixed size relationship to each other. The advantage of this design is comprised therein, that out of the differences between the preferred directions of the reference characters of the known real reference marks and the instantaneous image of the reference marks, the orientation of the reference mark and therewith its rotational and pivot angle relative to a standardized orientation can easily be calculated. The advantage of the fixed number and fixed geometric relation is comprised in the simplification of the association or assignment of the individual contiguity areas as information bearers of the survey characters, orientation characters, and encoded characters. Further, this fixed number and fixed geometric relationship makes possible a supplemental simple checking step as to whether the object being examined is an actual reference mark or, as the case may be, whether it has a high degree of recognition.

In a further advantageous design of the inventive RMR process, the survey characters are designed in the form of a circular area, the orientation characters have a U-shaped design comprised of two side parts and a perpendicular thereto and substantially longer connecting segment, and the encoded characters are in the form of three adjacent numerals of a stripe-free font or by four characters, adjacent to each other, taken from the values of the 10 numerals and the 26 capital letters, in a stripe-free font. Thereby the survey characters, orientation characters, and the encoded characters are arranged relative to each other in a known, fixed geometric relationship in such a manner that the survey character in the shape of a circular area is located centrally within the U-shaped orientation character, and the encoded characters in the shape of a fixed number of known characters or figures are provided next to each other below the connecting segment of the U in a known, fixed separation and in a known, fixed size relation thereto. The advantage of this design is comprised therein, that on the one hand the U-shaped orientation character can be identified particularly easily by its design and geometric relationship to the other characters and that, by the perpendicular extension of the sides and connecting base, the two preferred directions of the reference mark can be identified particularly easily, and that both directions can be particularly simply identified on the basis of the clearly longer length of the connecting base. The advantage of the encoding by figures, herein being numbers and large letters, is comprised in their strict separation from the orientation characters, in their significantly better detectability and substantially simpler manner in which to extend the amount or depth of encoded data, in comparison for example to the conventional ring-encoding.

In a further advantageous design of the inventive RMR process, the decision, whether the object under examination is a supposed or actual reference mark, and the classification of the individual contiguous areas as survey, orientation, or encoding characters, is carried out in such a manner, that first, in the neighborhood of the known pixel coordinates of the center of a supposed or actual reference mark, a search is made for contiguous areas, and that for each of the detected contiguous areas of a supposed or actual reference mark, a rectangle is determined, which is the smallest, axially parallel, encompassing rectangle of the respective contiguous area. Thereafter the smallest contiguous area, within the encompassing rectangle in which known pixel-coordinates of the center of the supposed or actual reference character are situated, is identified as a potential bearer of survey characters, and the next larger contiguous area, within the encompassing rectangle of which the known pixel-coordinates of the center of supposed or actual reference character are situated, is identified as a potential bearer of orientation characters. Thereafter, on the basis of the encompassing rectangle, the decision is made whether the object being examined is a supposed or actual reference character, in that it is checked or determined, whether the two rectangles exist within a predetermined tolerance range in known geometric relationship to each other, here for example in such a manner, that both exist in a known size relationship to each other, and one is encompassed by the other. The rejection of the reference mark occurs when this tolerance range is exceeded. The advantage of this design as comprised therein, that therewith by very simple and thus rapid means a decision can be made as to whether the object being examined is a supposed or an actual reference mark, and at the same time, the assignment or classification of the individual contiguous areas as survey, orientation, or encoding characters can occur. The actual extraction of the information can then occur exclusively at the known, respectively essential information bearing areas and therewith occur more rapidly.

In a further step of this advantageous design of the inventive RMR process, the orientation of the reference marks, in the case that the objects being examined are recognized as being actual reference marks, is determined. This occurs, for example, in the manner that the polygon approximation of the orientation character is determined, and that the angle of the orientation character relative to the main axis of the pixel-coordinate system is determined by plotting the details of the length of the polygon sections of the polygon approximation weighted in an angle histogram and by the determination of the two highest amplitudes of this angle histogram, and the association of the highest amplitude to the connecting segment of the U and the association of the second highest amplitude to the side segments of the U. In the other advantageous variations of the invention, the determination of the orientation of the reference marks occurs in such a manner, that likewise a polygon approximation of the orientation character is produced, that the angle of the orientation character relative to the main axis of the pixel-coordinate system is determined, in which for the one part the longest polygon section is assigned to the connecting segment of the U and also all other polygon sections within a predetermined angular tolerance range are associated with the connecting segment of the U and after their summation the calculations of the weighted center of the angle of this polygon segment occurs, and for the other part the longest polygon segment which is not associated with the connecting base of the U is associated with the side segments of the U and also all other polygon sections within a predetermined angle tolerance range are associated with the side segments of the U and following their summation the calculations of the weighted center of the angle of this polygon occurs. In both variants there follows from the recognition of the angle of the connecting or base segment of the U relative to the main axis of the pixel-coordinate system a calculation of the rotation angle of the reference mark, and from the recognition of the angle of the side segments of the U relative to the main axis of the pixel-coordinate system the calculation of the shear or warp angle of the reference mark. Therein the rotation of the reference mark is taken into consideration and the calculated supposed shear or warp angle is correspondingly corrected. The advantage of this design lies in the high speed of execution.

In a further step of this advantageous design of the inventive RMR process, following the recognition of the rotation angle and shear angle of the reference mark, a rotation and a shear standardization or normalization of the image of the reference mark is carried out, and in the rotation and shear standardized image individual contiguity areas are identified as bearers of encoded characteristics in such a manner that it is checked whether the requisite amount thereof are situated below the connecting segment of the U, and whether their size differences lie within a predetermined tolerance range. In the case of non-satisfaction of this recognition or identification criteria, a rejection of the reference mark occurs. The advantage of this design is comprised therein, that with a very simple and thus rapid means a determination can be made with a high degree of confidence as to whether the object being examined is a reference mark and whether the recognition thereof is carried out with a high degree of recognition quality.

The underlining concept of the inventive process for surveying objects comprises first forming a digital image of pixels of the object to be measured or surveyed, using electromagnetic waves from the optical or adjacent wavelength range, which digital image is provided with reference marks containing survey or index characters, orientation characters, and encoded characters, and that within this digital image of the object potential reference marks—that is, supposed or actual reference marks—are identified, for example light-colored surfaces, of which the size lies within a predetermined tolerance range, and that the pixel-coordinates of the centers of these potential reference marks are determined or identified, and that a recognition of the reference marks occurs locally within the neighborhood or environment of the pixel-coordinates at the center of the potential reference mark using of one or more of the above-described designs of the inventive process for recognition of reference marks, and that the pixel-coordinates of the individually recognized reference marks are placed in reference to a 3D-coordinate system of the object to be surveyed, for example are taken into consideration using a 3-D correspondence, for example using photogrammetry.

The core of the invention, with respect to the reference marks, resides therein, that they are comprised of surveying characters, orientation characters, and encoded characters which are independent from each other and spatially separated in such a manner that the orientation character is comprised of at least two indicia perpendicular to each other, and that the encoded character is provided in the shape of a fixed number of known figures and/or symbols, and that the surveying character, orientation character, and encoding characters are provided in a known fixed number and that the surveying character, orientation character, and encoded characters possess a known fixed geometric relation to each other, in particular known, fixed separation and relative positions to each other, and further are provided in a known fixed size relationship to each other.

In a particularly preferred design of the reference mark, this contains survey characters in the form of a circular area, and contains orientation-marks which have a U-shaped design comprised of two side parts and a perpendicular thereto and significantly longer base or connecting segment, and further contains encoded characters, which are designed to take the form of either 3 side-by-side numbers of a stripeless font or 4 side-by-side figures selected from the 10 numerals and the 26 capital letters of a stripeless font. Further, the surveying character, orientation character, and encoded characters are provided relative to each other in a known fixed geometric relationship in such a manner that the surveying character in the shape of a circular area is provided centrally within the U-shaped orientation character, and such that the encoded characters are provided in the form of a fixed number of known figures side-by-side below the cross piece of the U in a known, fixed separation and in a known, fixed size relationship thereto.

BRIEF DESCRIPTION OF THE DRAWING

In the following the invention will be described in greater detail on the basis of an illustrative embedment and the figures wherein.

In the following, an illustrative embodiment of the inventive process for surveying objects and an exemplary embodiment of the inventive process for recognition of reference marks is described in greater detail.

The object to be surveyed is provided with reference marks.

DETAILED DESCRIPTION OF THE INVENTION

Figure 1:
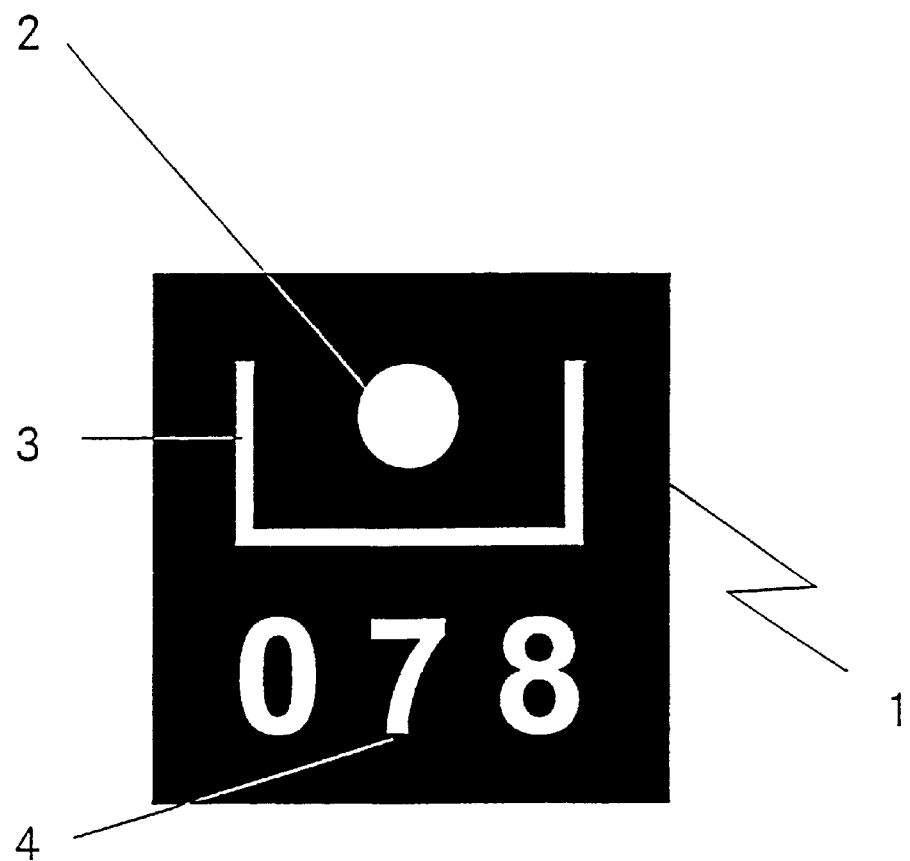
FIG. 1 shows a reference mark according to the invention with a surveying character in the shape of a circular area, an orientation character in the shape of a U, and encoded characters.
Figure 2:
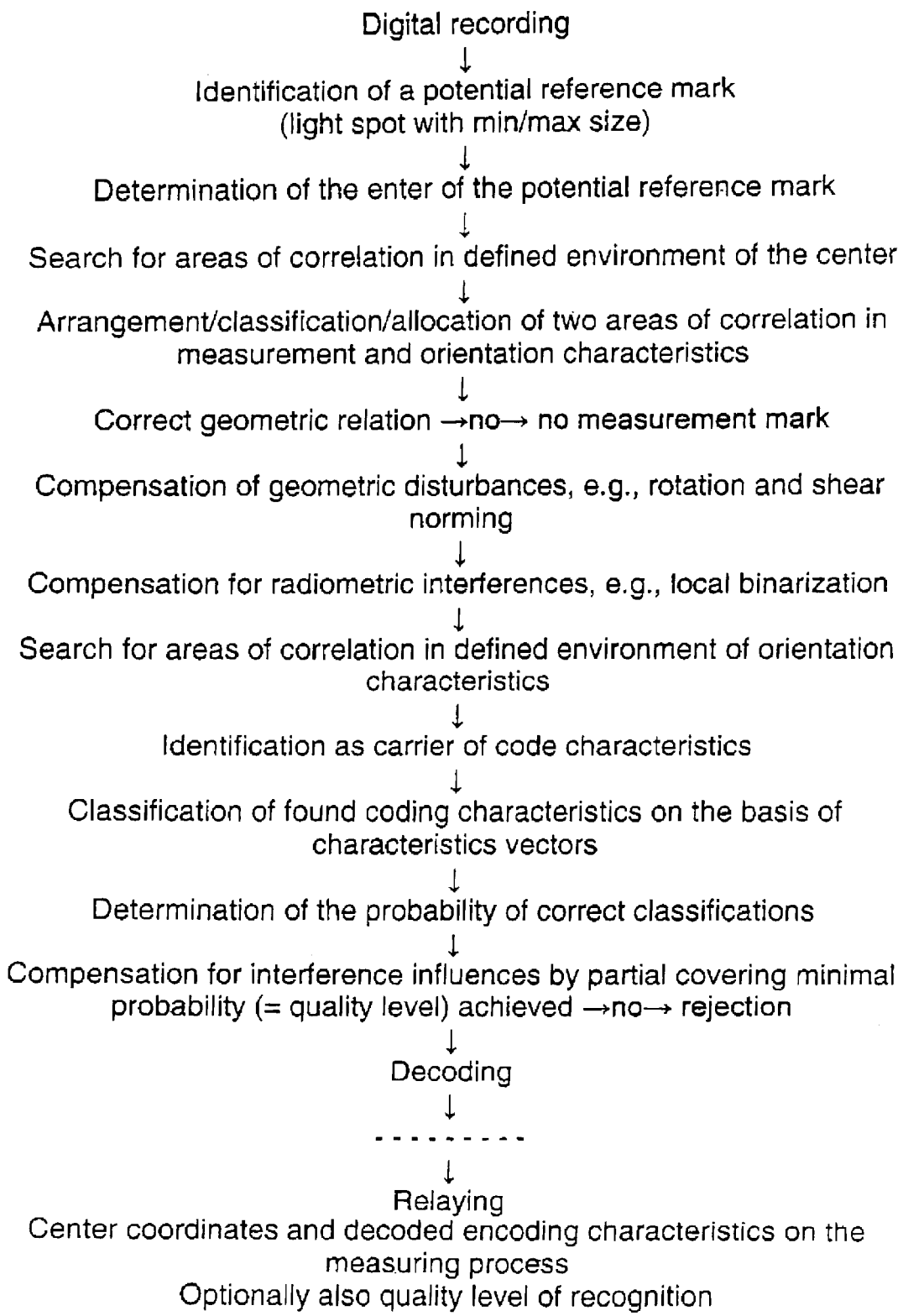
FIG. 2 is a flow diagram showing the steps of the inventive process.
Figure 3:
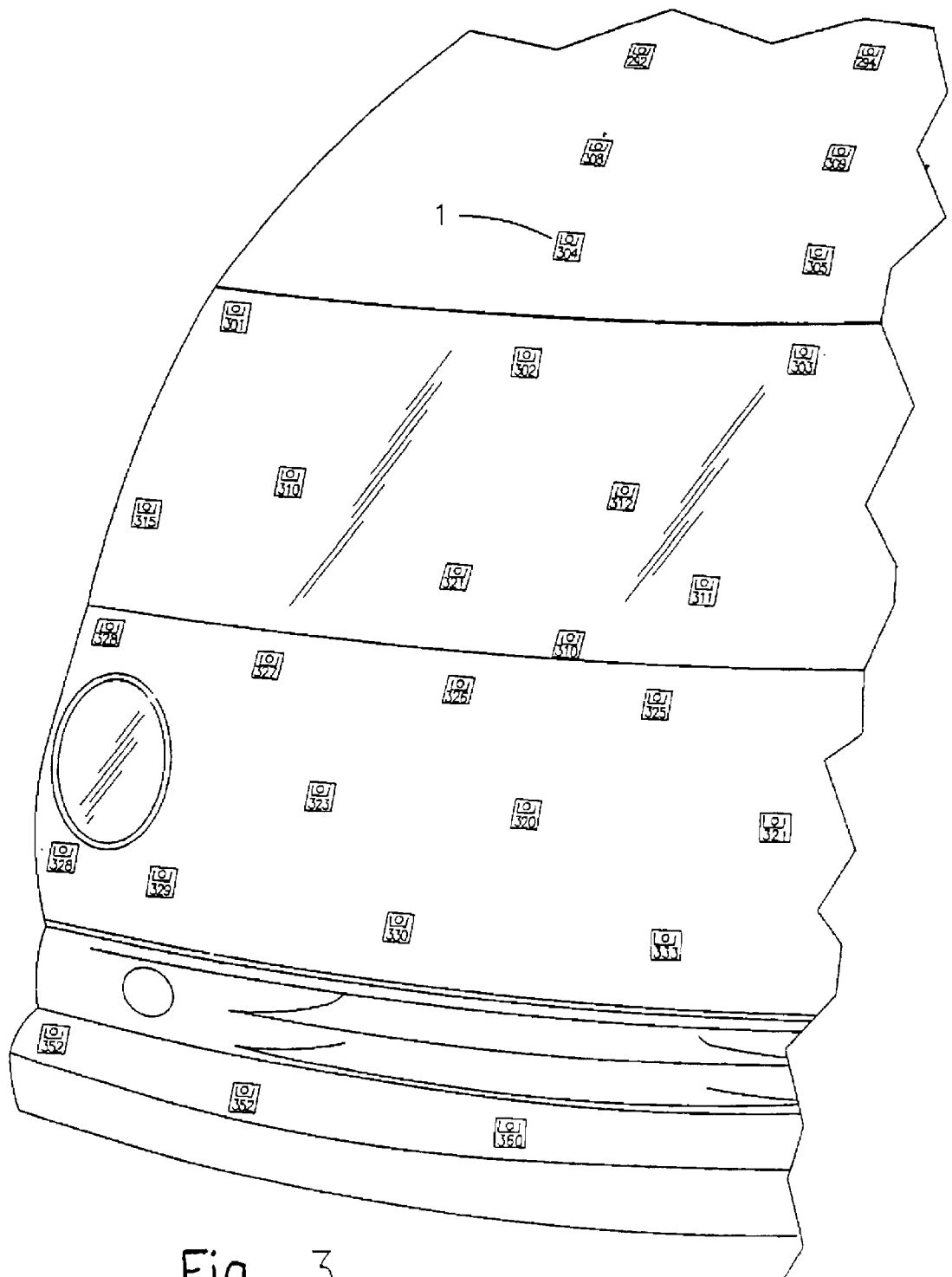
FIG. 3 shows the mark in place on an object being surveyed or measured, in this case an automobile body.

One such reference mark 1 is shown (enlarged) in FIG. 1. It includes a surveying character 2 in the shape of a circular area, an orientation character 3 in the shape of a U, in the center of which the surveying character is situated, and of which the cross-segment is significantly longer than the side segments, and encoded characters 4 in the shape of three numbers of uniform size, which are provided in a fixed separation below the cross-segment of the U.

The object provided with reference marks is recorded as a gray value image from various positions using optical digital cameras. By means of 3-D correspondence analysis, the 3D coordinates of the object are compared against the pixel-coordinates of an image of the object.

Potential reference marks are detected within the total picture. These could be actual reference marks or merely supposed reference marks, for example reflected light or other light disturbances. For these potential reference marks, the pixel coordinates of their centers are determined. Subsequently, a process for recognition of reference marks is carried out.

In a following exemplary embodiments of the inventive process for recognition of reference marks will be described in greater detail, wherein first the environment or neighborhood around the known pixel-coordinates of the center of a potential reference mark is converted to binary data. For this, beginning with the known pixel-coordinates, first the surveying character—that is, the circular area—is determined. The circular area of an actual reference mark is white. It has a high gray value, which in the scale used herein should lie in the vicinity of 255. Beginning with the known pixel-coordinates, the diameter of the circular area in horizontal and vertical direction is measured and the result averaged, wherein as the border of the circular area a drop in the gray value of the pixels being examined with respect to the gray value of the central pixels has a drop of 50%. As environment to be examined, an area with ten times the diameter of the measured circle and with the same center is examined. Within this environment the gray values of all pixels are averaged and with this intermediate value as gray value, a conversion of the environment to binary data of is carried out.

The averaging of the gray values for determining the threshold value for the binary conversion occurs in the following manner: first, within the environment around the pixel-coordinates at the center of the supposed or actual reference mark, the maximal and the minimal gray values of the pixels are determined. Thereafter, each pixel within this environment, of which the gray value is closer to the maximum gray value of all pixels within this environment than the minimal gray value of all pixels within this environment, is assigned to a group of pixels with high gray value. Pixels of which the gray value lies exactly between the maximal and minimal gray value are likewise assigned to this group. Each pixel within this environment, of which the gray value is closer to the minimal gray value of all pixels within this environment than to the maximal gray value of all pixels within this environment, is assigned to a group of pixels with low gray value. Thereafter, the central or mean value of all gray values of all pixels of the group of pixels with high gray values is determined and is weighted with the number of the group elements, and a central or mean value of all gray values of all pixels from the group of pixels with low gray values is determined and weighted with the number of the group elements. Thereafter, from these two weighted values, an average value is formed, which serves as the threshold value for binary conversion.

In the actual binary conversion, each pixel within this environment, of which the gray value exceeds the threshold value or is equal to the threshold value, receives a binary value of white, and each pixel within this environment, of which the color or gray value lies below the threshold value, receives a binary value of black.

Within this binary converted environment, contiguous areas are searched for, in such a manner, that all adjacent pixels, which following binary conversion are white or black, are assigned to a respective contiguous area.

The decision, as to whether an actual reference mark is situated in the examined environment of the known pixel-coordinates, and in certain cases the arrangement or assignment of the individually found contiguous areas to specific character types, occurs in the following manner: first, for each found contiguous area of a supposed or actual reference mark, a rectangle is determined, which is the smallest, axially parallel, encompassing rectangle of the respective contiguous area. Then, the smallest contiguous area, within the encompassing rectangle of which the known pixel-coordinates of the center of the supposed or actual reference mark is situated, is viewed as the contiguous area which contains the survey character, and the next larger contiguous area, within the encompassing rectangle of which the known pixel-coordinates of the center of the supposed or actual reference mark is located, is viewed as the contiguous area which contains the orientation character. Thereafter, it is checked, whether the following condition is satisfied. Within a predetermined tolerance range, the two rectangles are in known geometric relation to each other, that is in particular, they are in a known size relationship to each other, and the one is encompassed by the other. If this condition is not satisfied, then the object being examined is rejected as merely a supposed reference mark.

If the examined object is recognized as an actual reference mark, then the orientation is determined as follows:

First, a simplified representation of the detected contiguous areas is produced, here in particular a contour representation using polygons, a polygon representation. Then, this original polygon representation is substituted by an approximate polygon representation, a polygon approximation. This polygon approximation is carried out in such a manner that it exclusively extracts support points of the original polygon of the contour representation and does this so long until a predetermined maximal tolerance of surface or area or zone deviation is exceeded.

From the thus-determined polygon sections, the longest is assigned as the connecting leg of the U, as is as every other polygon segment, which is situated relative to the first within the predetermined angle tolerance range. From the so-determined polygon segment a weighted center or average of the angle relative to the main axis of the pixel-coordinate system is calculated. From the polygon segments which have not yet been taken into consideration, the longest side segment of the U is assigned as well as each further polygon segment, which is situated relative to the first within a predetermined angle tolerance range. From the so-determined polygon segments, the weighted or averaged center of their angle relative to the main axis of the pixel-coordinate system is calculated.

From the recognition of the angle of the connecting leg of the U relative to the main axis of the pixel-coordinate system, the rotation angle of the reference mark is calculated and a rotation standardization or normalization of the image of the reference mark is carried out. From the recognition of the angle of the side segments or legs of the U relative to the main axis of the pixel-coordinate system, the purported shear angle of the surveying character is calculated and from this supposed shear angle, based on the recognition of the rotation angle, the actual shear angle is calculated and a shear normalization or standardization of the image of the reference mark is carried out.

In the rotated and shear normalized image of the reference mark, the contiguous areas, which contain the encoded characters, are identified as follows:

It is verified, whether a predetermined fixed number of contiguous areas are situated below the connecting leg of the U and whether the size difference thereof lies within a predetermined tolerance range. A non-satisfaction of this identification requirement results in a rejection of the reference mark.

Upon satisfaction of this identification criteria, the decoding of the encoded characters occurs as follows:

Each contiguous area, which is identified as bearer of encoded characters, is normalized for size onto a 16 by 16 grid and is contrast-enhanced by a scaling of the gray values of the individual grid elements of the contiguous area over a gray value range of 0 to 255. Each gray value of this 16 by 16 grid is detected as component of a 256-dimensional character vector of this contiguous area and the so-formed character vector is subjected to a main axis transformation in such a manner that the individual components of the transformed reference character vector are available according to their importance for a classification in an arranged series sequence. The first, and thus most important 40 components of this reference character vector are submitted to an individual-figure-classification, here especially a one-step quadratic polynomial classification.

By means of this classification, a probability vector is calculated, of which the component number corresponds to the number of the possible figures, that is, here according to the numbers of characters, which is equal to 10, and of which the components provide the possibility of the identification of a specific figure class. Then, the figure class of which the identification occurs with the highest probability is presumed to be the correct one, in so far as this probability exceeds a predetermined minimal value. If this minimal probability value for the correct decoding is not achieved, then a rejection of the reference mark occurs.

After a successful recognition of the reference mark, that is, a successful identification of an actual mark and successful decoding of the encoded character, the results—the reference point coordinates with the associated decoded encoded characters—are relayed on to the process for surveying of objects optionally, a quality measurement of the recognition, for example, for the lowest of the respective probability values of the correct recognition of the three numbers, can be transmitted.

In the way of a 3-D correspondence analysis, here especially by means of photogrammetry, the real 3-D coordinates of the object being measured are determined from the pixel-coordinates of the reference character. Therein the quality measurement of the recognition can be taken into consideration and a corresponding weighting of the individual reference marks can occur.

The inventive process for object surveying in the embodiment of the illustrative example has proven to be particularly suitable for the surveying of larger objects, for example automobiles.

The invention is not limited to only the above-described illustrative embodiment, but rather can be applied to various embodiments.

So it is possible, for example that the object being measured need not be provided with reference marks in concrete or material form, but rather than light can be projected upon the surface of the object through appropriately shaped or designed masks, or appropriately designed reference marks can be formed directly on the object surface using a laser beam. A purely optical method of this type for the provision of reference marks upon the object surface would make possible the surveying of objects with extremely sensitive outer surfaces or surfaces which are difficult to access, and even for the surveying of liquid surfaces.

The specification of the priority application, German Application No. 197 28 513.9 is incorporated by reference herein.

What is claimed is:

1. A process for recognition of reference marks for surveying of objects, each reference mark comprised of at least one survey character, at least one orientation character, and multiple encoded characters, comprising:
   forming a digital image comprised of pixels of a supposed or actual reference mark using electromagnetic waves in the optical or an adjacent wavelength range, automatically compensating for geometric distortions effecting the recognizability of the reference mark with the aid of the orientation character, determining the pixel coordinates of the center of the supposed or actual reference mark within their digital image, automatically compensating for radiometric disturbances, automatically compensating for disturbances due to partial covering, defining at least one quality measurement for the recognition of the reference mark, performing at least one reassessment check for positive recognition of an actual reference mark or for rejection of a supposed reference mark on the basis of said at least one quality measurement, and extracting from at least one of said encoded characters of an actual reference mark a characteristic character vector, which is supplied to a classification system, and that the reference marks being recognized are comprised of spatially separated survey, orientation and encoded characters.

2. A process according to claim 1, wherein the digital image of the supposed or actual reference mark is locally converted to binary data prior to said steps of compensation for disturbing influences, checking of at least one rejection criteria, and extraction of the character vector of an actual reference mark.

3. A process according to claim 2, wherein said local conversion to binary data occurs by a process comprising:

determining, within a predetermined neighborhood of the pixel coordinates of the center of the supposed or actual reference mark, the maximal and the minimal color-value or gray-value of the pixels, assigning each pixel within this neighborhood, of which the color value or gray value is closer to the maximal color value or gray value of all pixels within this neighborhood than to the minimal color value or gray value of all pixels within this neighborhood, or of which the color value or gray value lies precisely in the middle of these two values, to a group of pixels with high color value or gray value, and assigning each pixel within this neighborhood, of which the color value or gray value is closer to the minimal color value or gray value of all pixels within this neighborhood than to the maximal color value or gray value of all pixels within this neighborhood, to a group of pixels with low color value or gray value, determining the average of all color or gray values of all pixels of the group of pixels with high color or gray value and weighting the average with the number of the elements of the group, determining the average of all color or gray values of all pixels of the group of pixels with low color or gray value and weighting the average with the number of elements of the group, forming an average value from these two weighted average values, which is used as the threshold in the binary conversion, assigning to each pixel within this neighborhood of which the color or gray value is greater than the threshold or equal to the threshold a binary value of white, and assigning to each pixel within this neighborhood of which the color or gray value is below the threshold receives a binary value of black.

4. Process according to claim 1, comprising:

providing the surveying character, orientation character, and encoded characters of the reference mark in known, fixed numbers, arranging the surveying characters, orientation characters, and encoded characters in known, fixed geometric relationships relative to each other, identifying congruency areas within the digital image of the supposed or actual reference mark, and making a decision on the basis of these congruency areas as to whether the object under examination is an erroneous or an actual reference mark, wherein the decision, as to whether the object being examined is an erroneous or actual reference mark, is made on the basis of the congruency areas in which it is checked whether the individual found congruency areas exhibit the predetermined minimum number, and exist in known geometric relation to each other within a predetermined tolerance range, and rejecting a mark as erroneous upon assessment of a congruity as an interference, and in the case of an assessment of the congruous area as an actual reference mark, making an unequivocal assignment for each individual congruous area, in such a manner, that it is recognized which individual congruous area is bearer of surveying characters and/or orientation characters and/or encoded characters.

5. Process according to claim 4, wherein said surveying characters, orientation characters, and encoded characters are arranged in in known, fixed separation and positions relative to each other, and wherein, in the decision, as to whether the object being examined is an erroneous or actual reference mark, it is checked whether the individual found congruency areas exhibit the predetermined minimum number, and exist in known geometric relation to each other within a predetermined, freely pre-selected, tolerance range.

6. A process according to claim 5, wherein the identification of the congruous areas occurs by a process comprising:

in the case of color value objects, performing a congruency analysis of the color value objects of the digital image of the supposed or actual reference mark, wherein all pixels of the digital image, of which the color-value lies within a predetermined value range, are assigned to a color value object, in the case of gray value objects, performing a congruency analysis of gray value objects of the digital image of the supposed or actual reference mark, wherein all pixels of the digital image, of which the gray value lies within a predetermined value range, are assigned to a gray value object, and in the case of black-and/or-white objects, performing a congruency analysis of the black or the white objects of the binary converted digital image of the supposed or actual reference mark.

7. A process according to claim 5, wherein the identification of the congruency areas occurs by a process comprising:

in the case of color-value objects, performing a congruency analysis of color-value objects of the digital image of the supposed or actual reference mark, wherein all pixels of the digital image are assigned to a color value object via a classification of color values, optionally after taking into consideration the color values in a local neighborhood, in the case of gray value objects, performing a congruency analysis of gray value objects of the digital image of the supposed or actual reference mark, wherein all pixels of the digital image are assigned to a gray value object by means of a classification of the gray value, optionally after taking into consideration the gray value in a local neighborhood, in the case of black-and-white objects, performing a congruency analysis of black and white objects of the binary converted digital image of the supposed or actual reference mark.

8. A process according to claim 3, further comprising:

forming a simplified representation of the detected congruency areas, preferably a contour representation using polygons—a polygon representation, optionally replacing the original polygon representation with an approximate polygon representation—polygon approximation, wherein said polygon approximation is optionally prepared by exclusively extracting support points of the original polygon of the contour representation and continuing this until a predetermined maximal tolerable area deviation is exceeded.

9. A process according to claim 4, comprising:

identifying, from the number of the found congruency areas of an actual reference mark, a congruency area as the bearer of orientation characters via the recognition of the geometric relation of the various congruency areas to each other, determining the actual orientation of the reference mark from this orientation character, carrying out a standardization or normalization to a fixed, pre-determined standard or uniform orientation, preferably a normalization of the digital image of the reference mark or the congruent areas thereof, preferably a normalization of the representation of the congruent areas, identifying from among the number of detected congruent areas at least one congruent area as bearer of encoded characters via the recognition of the geometric relation of the various congruent areas to each other, and standardizing or normalizing each congruent area, which was identified as bearer of encoded characters, in size and plotting it onto a n-by-n grid, preferably a 16-by-16 grid, and optionally subjecting each congruency area, which was identified as bearer of encoded characters, to contrast enhancement by the scaling of the color value or gray value of the individual grid elements of the congruent area over a maximal color value or gray value range, preferably over a gray value range of 0–255, using each color value or gray value of a grid element of a congruent area, which was identified as bearer of coded characters, as a component of an n-by-n dimensional, preferably 256 dimensional, character vector of a congruent area, subjecting this character vector to a main axis transformation in such a manner that the individual components of the transformed character vector are provided in arranged sequence according to their value or weight for a classification, and submitting a limited number of components of the transformed character vector, counted beginning with the first and most important component, preferably the first 40 components, to an individual object classification, preferably an individual character or individual symbol classification, preferably a one-step quadratic polynomial classification, using this classification to calculate a probability vector, of which the component number corresponds to the number of the possible encoded objects, preferably equal to the number of the possible encoded figures or encoded symbols, and of which the components indicate the probability of the identification of a particular object class, preferably the probability of the identification of a certain figure or symbol class, and presuming that the object class, preferably figure or symbol class, of which the identification occurred with the highest probability, is valid, so long as this probability exceeds a predetermined minimal value, and rejecting the reference marks when no object class, preferably no figure or symbol class, is identified with a probability greater than the predetermined minimal probability.

10. A process according to claim 1, wherein:

the reference marks to be recognized exhibit
surveying characters,
orientation characters including features extending in at least two directions, preferably in directions which are perpendicular to each other, and
encoded characters in the form of a fixed number of figures and/or symbols, and the surveying characters, orientation characters, and encoded characters are provided in known, fixed number, and the surveying characters, orientation characters, and encoded characters have a known, fixed geometric relationship to each other, preferably a known, fixed separation and relative position to each other, and are present in a known, fixed size relationship to each other.

11. A process according to claim 1, wherein:

the surveying character is in the form of a circular area, the orientation character is formed in a U-shaped design, comprised of two side parts and a connecting segment perpendicular to the side parts and preferably significantly longer, the encoded characters are designed in the shape of
three side-by-side numbers of a stripeless font, or
four side-by-side figures selected from the 10 numbers and the 26 capital letters of a stripeless font, and the survey character, orientation character, and encoded characters are provided relative to each other in a known, fixed geometric relation in such a manner,
that the survey mark in the shape of a circular area is situated centrally within the U-shaped orientation character, and
that the encoded characters in the form of a fixed number of known figures are provided below the connecting segment of the U in a known, fixed separation and in a known, fixed size relationship thereto and side-by-side.

12. A process according to claim 10, comprising:

performing a search for congruency areas in the neighborhood surrounding the known pixel coordinates of the center of a supposed or actual reference mark, defining, for each detected congruency area of a supposed or actual reference mark, a rectangle which is the smallest, axially parallel encompassing rectangle of the respective congruency area, identifying the smallest congruency area, within the encompassing rectangle of which the known pixel coordinates of the center of the supposed or actual reference mark are situated, as the congruency area, which contains the survey mark, identifying the next largest congruency area, within the encompassing rectangle of which the known pixel coordinates of the center of the supposed or actual reference mark are located, as the congruency area which contains the orientation character, and making a decision, on the basis of the encompassing rectangles, whether the object being examined is a supposed or actual reference mark, said decision making comprising checking whether the geometric relationship of the two rectangles to each other is within a predetermined tolerance range, preferably in a known size relationship to each other, or the one is enclosed by the other, rejecting the reference mark, when this tolerance range is exceeded, determining the orientation of the mark, when this tolerance range is not exceeded, said determination of the orientation comprising, producing a polygon approximation of the orientation character, and determining angle of the orientation character relative to the main axis of the pixel-coordinate system by plotting the individual polygon segments of the polygon of the polygon approximation with their lengths being weighted or averaged in an angle histogram, determining the two highest amplitudes of this angle histogram, assigning the highest of these two amplitudes to the connecting segment of the U, and assigning of the second highest of these two amplitudes to the side segments of the U, or determining the angle of the orientation character relative to the main axis of the pixel-coordinate system by assigning the longest polygon segment as the connecting segment of the U, assigning all polygon segments within a predetermined angle tolerance range to the connecting segment of the U, calculating the weighted center of the angle of this polygon segment, assigning the longest polygon segment which is not assigned to the connecting segment of the U as the side segment of the U, assigning all other polygon segments within a predetermined angle tolerance range to the side segments of the U, and calculating or determining of the weighted center or mean of the angle of these polygon segments, and calculating, from the recognized angle of the connecting segment of the U relative to the main axis of the pixel-coordinate system, the rotation angle of the reference character and carrying out a rotation normalization of the image of the reference mark, calculating, from the recognition of the angle of the side segment of the U relative to the main axis of the pixel-coordinate system, the supposed shear angle of the reference mark, and from this supposed shear angle, by means of recognition of the rotation angle, calculating the actual shear angle, and carrying out a shear normalization or correction of the image of the reference mark, checking the congruency areas for the encoded characters in the rotation and shear normalized image of the reference mark, to verify that they are found in a known quantity below the connecting segment of the U, and that their size differences lie within a predetermined, preferably freely pre-selected, tolerance range, and rejecting the reference mark upon non-satisfaction of this verification criteria.

13. A process for surveying an object, comprising:

providing the object to be surveyed with reference marks containing survey characters, orientation characters, and encoded characters, and producing a digital image comprised of pixels of the object provided with reference marks, using electro-magnetic waves from the optical wave-length or an adjacent wave-length range, identifying potential reference marks, which may be either supposed or actual reference marks, in the digital image of the object comprised of pixels, and determining the pixel-coordinates of the center of these potential reference marks, evaluating reference marks by employing a process for recognition of reference marks for surveying of objects, each reference mark comprised of at least one survey character, at least one orientation character, and multiple encoded characters, comprising:

forming a digital image comprised of pixels of a supposed or actual reference mark using electro-magnetic waves in the optical or an adjacent wavelength range, automatically compensating for geometric distortions effecting the recognizability of the reference mark with the aid of the orientation character, determining the pixel coordinates of the center of the supposed or actual reference mark within their digital image, automatically compensating for radiometric disturbances, automatically compensating for disturbances due to partial covering, defining at least one quality measurement for the recognition of the reference mark, performing at least one reassessment check for positive recognition of an actual reference mark or for rejection of a supposed reference mark on the basis of said at least one quality measurement, and extracting from at least one of said encoded characters of an actual reference mark a characteristic character vector, which is supplied to a classification system, and that the reference marks being recognized are comprised of spatially separated survey, orientation and encoded characters wherein the evaluation of the reference mark is carried out locally within the neighborhood surrounding the pixel coordinates of the center of these potential reference marks, and placing the pixel coordinates of the individually recognized reference marks in reference to a 3-D coordinate system of the object to be surveyed, optionally using a 3-D correspondence analysis.

* * * * *